US008526353B2

(12) United States Patent
Yokota

(10) Patent No.: US 8,526,353 B2
(45) Date of Patent: Sep. 3, 2013

(54) COMMUNICATION DEVICE, RADIO COMMUNICATION DEVICE, COMMUNICATION CONTROL METHOD AND RADIO COMMUNICATION METHOD

(75) Inventor: Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 744 days.

(21) Appl. No.: 12/294,885

(22) PCT Filed: Mar. 28, 2007

(86) PCT No.: PCT/JP2007/056729
§ 371 (c)(1),
(2), (4) Date: Jun. 21, 2010

(87) PCT Pub. No.: WO2007/114193
PCT Pub. Date: Oct. 11, 2007

(65) Prior Publication Data
US 2010/0278095 A1    Nov. 4, 2010

(30) Foreign Application Priority Data
Mar. 28, 2006   (JP) .................................. 2006-089133

(51) Int. Cl.
*H04W 88/04*   (2009.01)
(52) U.S. Cl.
USPC ........... 370/315; 370/263; 370/501; 370/279; 370/274; 370/492
(58) Field of Classification Search
USPC ................. 370/315, 316, 263, 279, 274, 492, 370/501
See application file for complete search history.

(56) References Cited

U.S. PATENT DOCUMENTS

| 6,549,522 | B1 | 4/2003 | Flynn |
| 2003/0112878 | A1* | 6/2003 | Kloper .......................... 375/259 |
| 2005/0185853 | A1 | 8/2005 | Ono et al. |
| 2006/0039335 | A1* | 2/2006 | Ono et al. ...................... 370/338 |

FOREIGN PATENT DOCUMENTS

| JP | 2000216815 A | 8/2000 |
| JP | 2002509391 A | 3/2002 |
| WO | 9931853 A1 | 6/1999 |

OTHER PUBLICATIONS

Atsushi Honda et al. "2002-DSM-28-6 Internet Hoso Service ni Okeru User Shiko QoS seigyo Shuho" Information Processing Society of Japan Kenkyu Hokoku, vol. 2002, No. 118, pp. 31-36, Dec. 13, 2002 (with English abstract).
C. Perkins "IP Mobility Support (RFC2002)" IETF Internet article (http://www.ietf.org/rfc/rfc2002.txt), pp. 1-79, Oct. 1996.
International Search Report for corresponding PCT application PCT/JP2007/056729 lists the references above.

(Continued)

Primary Examiner — Brandon Renner
Assistant Examiner — Abdelnabi Musa
(74) Attorney, Agent, or Firm — DLA Piper LLP (US)

(57) ABSTRACT

VoIP packets as many as the number transmittable within a time period equal to a window T1 minus a window T2 are transmitted to a radio IP network 10A in a case where the bandwidth of the radio IP network 10A is determined to be of a size not capable of transferring VoIP packets within a predetermined delay time period. In addition, a remaining number of VoIP packets excluding the number of VoIP packets transmittable within the time period equal to the window T1 minus the window T2 are transmitted to a radio IP network 10B.

16 Claims, 9 Drawing Sheets

(56) References Cited

OTHER PUBLICATIONS

Extended European Search Report for Application No. 07740167.7 dated Sep. 20, 2011.

Korean language Notice of Preliminary Rejection from the Korean Intellectual Property Office and its English Translation for Korean Patent Application No. 10-2008-7025261 dated Oct. 18, 2011.

* cited by examiner

COMMUNICATION DEVICE, RADIO COMMUNICATION DEVICE, COMMUNICATION CONTROL METHOD AND RADIO COMMUNICATION METHOD

CROSS-REFERENCE TO RELATED APPLICATIONS

This application is a national stage of international application no. PCT/JP2007/056729, filed on Mar. 28, 2007, and claims the benefit of priority under 35 USC 119 of Japanese patent application no. 2006-089133, filed on Mar. 28, 2006. The entire contents of these applications are incorporated herein by reference.

TECHNICAL FIELD

The present invention relates to a communication control device, a radio communication device, a communication control method and a radio communication method for executing communications via a radio IP network by use of a care of IP address.

BACKGROUND ART

In a radio communication network in which interact protocol (IP) set are used (hereinafter, referred to as a "radio IP network" as appropriate), so-called Mobile IP is defined in order to improve the mobility of a radio communication device (refer to Non-Patent Document 1, for example).

In Mobile IP, a care of IP address (Care of Address) dynamically assigned to a radio communication device in accordance with a position of the radio communication device is used.

Non-Patent Document 1: C. Perkins, "IP Mobility Support (RFC2002)" October 1996, IETF.

DISCLOSURE OP THE INVENTION

In recent years, an environment where a radio communication device is capable of using multiple radio IP networks (such as a cellular phone network and a wireless LAN network) has been provided.

However, there are the following problems if a radio communication device uses multiple radio IP networks in accordance with aforementioned Mobile IP. Specifically, in Mobile IP, care of IP addresses are assigned to a radio communication device in radio IP networks. Since the radio communication device is capable of using only a single care of IP address assigned thereto by any one of the radio IP networks, the radio communication device cannot use the multiple radio IP networks "simultaneously."

For this reason, when the radio communication device executes handover to another radio IP network, the communications in execution are interrupted. Moreover, it is difficult to use the multiple radio IP networks "seamlessly," that is, to support such a case that, when a bandwidth of radio IP network currently used in the communications in execution becomes insufficient, the insufficient bandwidth of a radio IP network is complemented by use of another radio IP network.

In this respect, the present invention is made in view of the aforementioned circumstance. An objective of the present invention is to provide a communication control device, a radio communication device, a communication control method and a radio communication method that is capable of simultaneously using multiple radio IP networks to complement an insufficient bandwidth of a radio IP network, currently used in the communications in execution, by use of another radio IP network when the currently-used radio IP network becomes insufficient.

In order to solve the aforementioned problem, the present invention includes the following aspects. To begin with, a first aspect of the present invention is summarized as a communication control device (switching server 100) that controls a communication path to a radio communication device (MN 300) by use of a first radio IP network (radio IP network 10A) in which a first care of IP address (care of IP address A1) is dynamically assigned to the radio communication device in accordance with a position of the radio communication device, and of a second radio IP network (radio IP network 10B) in which a second care of IP address (care of IP address A2) is assigned to the radio communication device. The communication control device comprises: a relay unit (packet relay unit 105) configured to receive an IP packet transmitted from the radio communication device to a communication destination (IP phone terminal 42) via the first radio IP network in a predetermined cycle (for example, 20 ms), and to relay the IP packet to the communication destination; a bandwidth determination unit (bandwidth computing unit 107 and main controller 111) configured to determine whether or not a bandwidth of the radio IP network used for receiving the IP packet from the radio communication device is of a size capable of transferring the IP packet within a predetermined time period (window T1) on the basis of the number of already received IP packets that have been received by the relay unit from the radio communication device within a former half time frame (window T2); a first uplink transmission controller (bandwidth computing unit 107 and main controller 111) configured to transmit first uplink transmission control information (complementary bandwidth amount notification message) to the radio communication device in a case where the bandwidth determination unit determines that the bandwidth is not of a size capable of transferring the IP packet within the predetermined time period, the information indicating an instruction to transmit, to the first radio IP network, IP packets as many as the number transmittable by use of the bandwidth within a latter half time frame (window T1 minus window T2), which is subsequent to the former half time frame, and a second uplink to transmission controller (bandwidth computing unit 107 and main controller 111) configured to transmit second uplink transmission Control information (complementary bandwidth amount notification message) to the radio communication device, the second uplink transmission control information indicating an instruction to transmit, to the second radio IP network the remaining number of IP packets excluding the number of IP packets transmittable within the latter half time frame.

According to the communication control device described above, in a case where the bandwidth of the first radio IP network used for receiving IP packets from the radio communication device is determined to be of a size not capable of transferring IP packet within a predetermined time period, the first uplink transmission control information indicating an instruction to transmit, to the first radio IP network, IP packets as many as the number transmittable by use of the bandwidth within the latter half time frame is transmitted to the radio communication device.

Moreover, the second uplink transmission controller indicating an instruction to transmit, to the second radio IP network, the remaining number of IP packets excluding the number of IP packets transmittable within the latter half time frame by use of the first radio IP network is transmitted to the radio communication device.

Thus, when the bandwidth of a radio IP network used in execution of communications is insufficient, the insufficient bandwidth can be complemented by another radio IP network while multiple radio IP networks are used simultaneously. In other words, it is possible to use the multiple radio IP networks "seamlessly," rather than to simply switch the multiple radio IP networks from one another.

Moreover, the first care of IP address assigned to the radio communication device in the first radio IP network and the second care of IP address assigned to the radio communication device in the second radio IP network are associated with a virtual address in the radio communication device, so that the radio communication device can execute communications by use of the multiple care of IP addresses simultaneously.

A second aspect of the present invention is related to the first aspect of the invention and summarized as the communication control device further comprises: a control information receiver (communication interface unit 101 and main controller 111) configured to receive first downlink transmission control information (complementary bandwidth amount notification message) from the radio communication device, the first downlink transmission control information indicating an instruction to transmit, to the first radio IP network, IP packets as many as the number transmittable within the latter half time frame; a virtual address acquisition unit (main controller 111 and storage unit 113) configured to acquire a virtual address of the radio communication device (home IP address AH), which is associated with the first care of IP address and the second care of IP address; and a first downlink transmitter (transmission packet distribution processor 109) configured to add the first care of IP address to an IP packet including the virtual address, which is received from the communication destination, and to transmit the IP packet to the first radio IP network on the basis of the first downlink transmission control information received by the control information receiver.

A third aspect of the present invention is related to the second aspect of the invention, and summarized as the communication control device, wherein the control information receiver receives second downlink transmission control information (complementary bandwidth amount notification message) indicating an instruction to transmit, to the second radio IP network, the remaining number of IP packets excluding the number of IP packets transmittable within the latter half time frame. The communication control device further comprises a second downlink transmitter (transmission packet distribution processor 109) configured to add the second care of IP address to an IP packet including the virtual address, which is received from the communication destination, and to transmit the IP packet to the second radio IP network on the basis of the second downlink transmission control information received by the control information receiver.

A fourth aspect of the present invention is related to the first aspect of the invention and summarized as the communication control device, wherein the bandwidth determination unit changes a size of the former half time frame on the basis of the number of already received IP packets.

A fifth aspect of the present invention is related to the fourth aspect of the invention and summarized as the communication control device, wherein the bandwidth determination unit increases the size of the former half time frame in a case where the number of IP packets obtained by subtracting the number of IP packets to be received within the former half time frame by the number of IP packets to be received within a sub-time frame (window T3, for example) not greater in size than the former half time frame is smaller than the number of already received IP packets.

A sixth aspect of the present invention is related to the fourth aspect of the invention and summarized as the communication control device, wherein the bandwidth determination unit decreases the size of the former half time frame in a case where the number of IP packets obtained by subtracting the number of IP packets to be received within the former half time frame by the number of IP packets to be received within the sub-time frame (window T3, for example) not greater in size than the former half time frame is greater than the number of already received IP packets.

A seventh aspect of the present invention is related to the fifth and sixth aspects of the invention and summarized as the communication control device, wherein the sub-time frame is a time frame defined in accordance with a jitter buffer that absorbs jitter of the IP packets.

An eighth aspect of the present invention is summarized as a radio communication device (MN 300) that executes communications with a communication destination via a communication control device, (switching server 100) by use of a first radio IP network (radio IP network 10A) in which a first care of IP address (care of IP address A1) is dynamically assigned to the radio communication device in accordance with a position of the radio communication device, and of a second radio IP network (radio IP network 10B) in which a second care of IP address (care of IP address A2) is assigned to the radio communication device, the device comprising: a receiver (radio communication card 301) configured to receive an IP packet transmitted from the communication destination via the radio IP network in a predetermined cycle (20 ms, for example); a bandwidth determination unit (bandwidth computing unit 307 and main controller 311) configured to determine whether or not a bandwidth of the radio IP network used for receiving the IP packet from the communication control device is of a size capable of transferring the IP packet within a predetermined time period (window T1) on the basis of the number of already received IP packets that have been received by the receiver from the communication control device within a former half time frame (window T2); a first downlink transmission controller (bandwidth computing unit 307 and main controller 311) configured to add the first care of IP address to each of IP packets as many as the number transmittable by use of the bandwidth within the a latter half time frame (window T1 minus window T2), which is subsequent to the former half time frame, and to transmit first downlink transmission control information (complementary bandwidth amount notification message) to the communication control device in a case where the bandwidth determination unit determines that the bandwidth is not of a size capable of transmitting the IP packets within the predetermined time period, the information indicating an instruction to transmit, to the first radio IP network, IP packets as many as transmittable to each of which the first care of IP address is added; and a second downlink transmission controller configured to add the second care of IP address to each of the remaining number of IP packets excluding the number of IP packets to each of which the first care of IP address is added, and to transmits second downlink transmission control information (complementary bandwidth amount notification message) to the communication control device, the second downlink transmission control information indicating an instruction to transmit, to the second radio IP network, the IP packets to each of which the second care of IP address is added.

A ninth aspect of the present invention is related to the eighth aspect of the invention and summarized as the radio communication device further comprising: a control information receiver (radio communication card 303 and main controller 311) configured to receive first uplink transmission control information (complementary bandwidth amount notification message) from the communication control device, the information indicating an instruction to transmit, to the first radio IP network, IP packets as many as the number transmittable within the latter half time frame; a virtual address storage unit (storage unit 313) configured to store a virtual address of the radio communication device (home IP address AH), the virtual address being associated with the first care of IP address and the second care of IP address; and a first uplink transmitter (transmission packet distribution processor 309) configured to transmit an IP packet including the virtual address and the first care of IF address to the first radio IP network, on the basis of the first uplink transmission control information received by the control information receiver.

A tenth aspect of the present invention is related to the ninth aspect of the invention and summarized as the radio communication device, wherein the control information receiver further receives second uplink transmission control information (complementary bandwidth amount notification message) indicating an instruction to transmit, to the second radio IP network, the remaining number of IP packets excluding IP packets as many as the number transmittable within the latter half time frame. In addition, the radio communication device further comprises a second uplink transmitter (transmission packet distribution processor 309) configured to transmit an IP packet including the virtual address and the second care of IP address to the second radio IP network on the basis of the second uplink transmission control information received by the control information receiver.

An eleventh aspect of the present invention is related to the eighth aspect of the invention and summarized as the radio communication device, wherein the bandwidth determination unit changes a size of the former half time frame on the basis of the number of already received IP packets.

An twelfth aspect of the present invention is related to the eleventh aspect of the invention and summarized as the radio communication device, wherein the bandwidth determination unit increases the size of the former half time frame in a case where the number of IP packets obtained by subtracting the number of IP packets to be received within the former half time frame by the number of IP packets to be received within a sub-time frame (window T3, for example) not greater in size than the former half time frame is smaller than the number of already received IP packets.

An thirteenth aspect of the present invention is related to the eleventh aspect of the invention and summarized as the radio communication device, wherein the bandwidth determination unit reduces the size of the former half time frame in a case where the number of IP packets obtained by subtracting the number of IP packets to be received within the former half time frame by the number of IP packets to be received within the sub-time frame (window T3, for example) not greater in size than the former half time frame is greater than the number of already received IP packets.

An fourteenth aspect of the present invention is related to any one of the twelfth and thirteenth aspects of the invention and summarized as the radio communication device, wherein the sub-time frame is a time frame defined in accordance with a jitter buffer that absorbs jitter of the IP packets.

A fifteenth aspect of the present invention is summarized as a communication control method of controlling a communication path to a radio communication device by use of a first radio IP network in which a first care of IP address is dynamically assigned to the radio communication device in accordance with a position of the radio communication device, and of a second radio IP network in which a second care of IP address is assigned to the radio communication device, the method comprising the step of: receiving an IP packet transmitted from the radio communication device to a communication destination via the first radio IP network in a predetermined cycle and relaying the IP packet to the communication destination; determining whether or not a bandwidth of the first radio IP network used for receiving the IP packet from the radio communication device is of a size capable of transferring the IP packet within a predetermined time period, on the basis of the number of already received IP packets received from the radio communication device within a former half time frame; transmitting first uplink transmission control information to the radio communication device in a case where the bandwidth determination unit determines that the bandwidth is not of a size capable of transferring the IP packet within the predetermined time period, the information indicating an instruction to transmit, to the first radio IP network, IP packets as many as the number transmittable by use of the bandwidth within a latter half time frame, which is subsequent to the former half time frame; and transmitting second uplink transmission control information to the radio communication device, the information indicating an instruction to transmit, to the second radio IP network, the remaining number of IP packets excluding IP packets as many as the number transmittable within the latter half time frame.

A sixteenth aspect of the present invention is Summarized as a radio communication method of executing communications with a communication destination via a communication control device by use of a first radio IP network in which a first care of IP address is dynamically assigned to the radio communication device in accordance with a position of the radio communication device, and of a second radio IP network in which a second care of IP address is assigned to the radio communication device, the method comprising the steps of receiving an IP packet transmitted from the communication destination via the first radio IP network in a predetermined cycle; determining whether or not a bandwidth of the first radio IP network used for receiving the IP packet from the communication control device is of a size capable of transferring the IP packet within a predetermined time period on the basis of the number of already received IP packets received from the communication control device within a former half time frame; adding the first care of IP address to each of IP packets as many as the number transmittable by use of the bandwidth within the a latter half time frame, which is subsequent to the former half time frame, and transmitting first downlink transmission control information to the communication control device, in a case where the bandwidth determination unit determines that the bandwidth is not of a size capable of transmitting the IP packet within the predetermined time period, the information indicating the instruction to transmit, to the first radio IP network, the IP packets to each of which the first care of IP address is added; and adding the second care of IP address to each of a remaining number of IP packets excluding the IP packets to each of which the first care of IP address is added, and transmitting second downlink transmission control information to the communication control device, the information indicating the instruction to transmit, to the second radio IP network, the IP packets to each of which the second care of IP address is added.

According to the aspects of the present invention, it is possible to provide a communication control device, a radio communication device, a communication control method and a radio communication method that is capable of simultaneously using multiple radio IP networks to complement an insufficient bandwidth of a radio IP network, currently used in the communications in execution, by use of another radio IP network when the w currently-used radio IP network becomes insufficient.

BEST MODE FOR CARRYING OUT THE INVENTION

Figure 1:
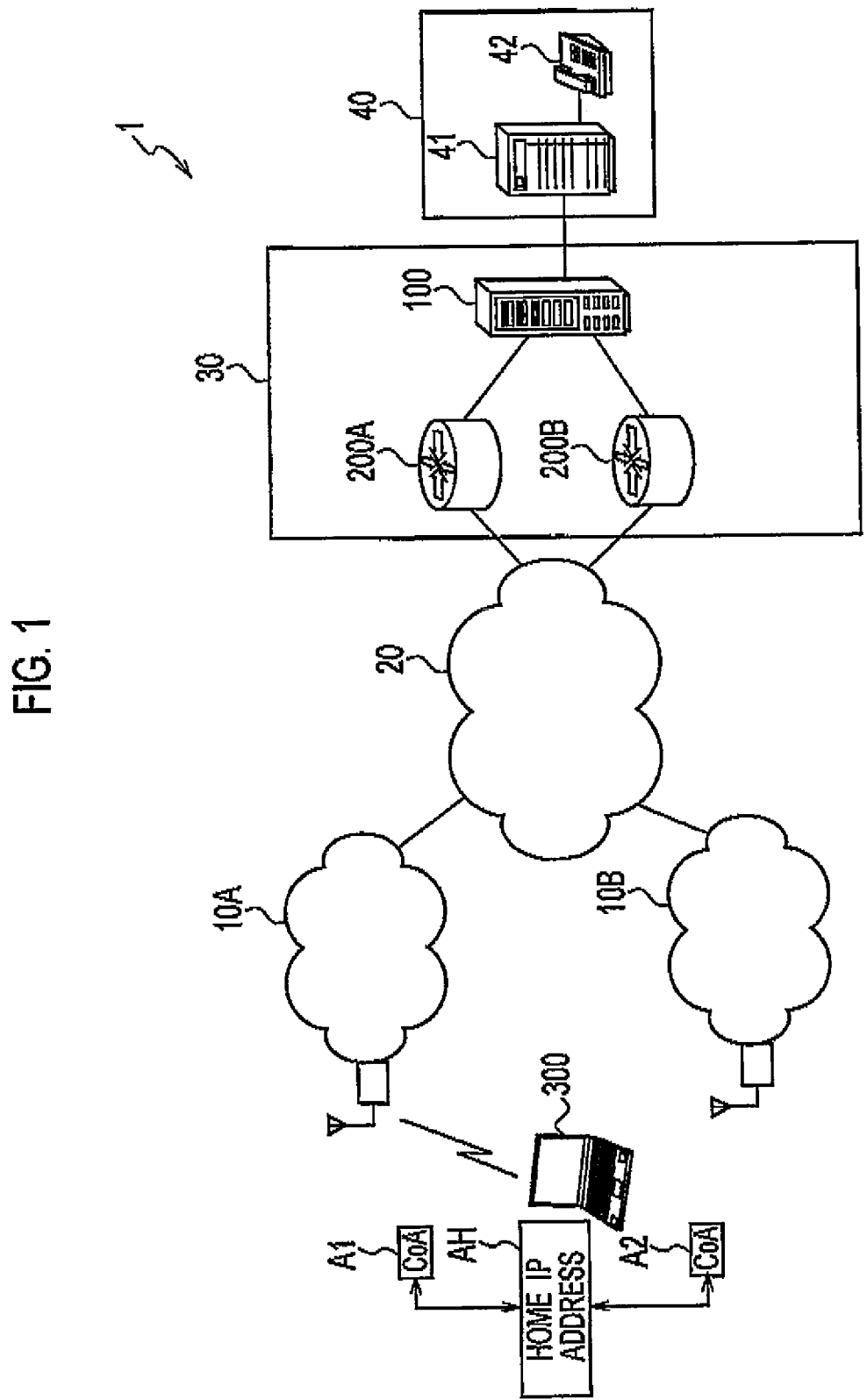
FIG. 1 shows an overall schematic configuration diagram of a communication system according to an embodiment of the present invention.

Next, an embodiment of the present invention will be described. Note that the same or similar portions are denoted by the same or similar reference numerals in the descriptions in the drawings below. It should be noted that the drawings are schematic, and that ratios of respective dimensions and the like differ from those in reality.

Accordingly, specific dimensions and the like should be determined in consideration of the descriptions below. As a matter of course, some of the dimensional relations and ratios differ in the drawings as well.
(Overall Schematic Configuration of Communication System)

FIG. 1 shows an overall schematic configuration diagram of a communication system 1 according to an embodiment of the present invention. As shown in FIG. 1, the communication system includes a radio IP network 10A and a radio IP network 103. The radio IP network 10A (a first radio IP network) is an IP network capable of transmitting IP packets. In the radio IP network 10A, a care of IP address A1 (a first care of IP address) is dynamically assigned to a radio communication device 300 (hereinafter, referred to as an MN 300) in accordance with a position of the MN 300. In this embodiment, the radio IP network 10A is a cellular phone network employing CDMA (in particular, HRPD, which is a 3GPP2 standard) as the radio communication scheme.

The radio IP network 10B (a second radio IP network) is also capable of transmitting IP packets similarly to the radio IP network 10A. In the radio IP network 10B, a care of IP address A2 (a second care of IP address) is assigned to the MN 300. In this embodiment, the radio IP network 10B employs Mobile WiMAX compliant with the IEEE 802.16e standard as the radio communication scheme.

Here, the care of IP address A1 is provided from the radio IP network 10A when the MU 300 is connected to the radio IP network 10A. Likewise, the care of IP address A2 is provided from the radio IP network 10B when the MN 300 is Connected to the radio IP network 10B.

In addition, in the present embodiment, the care of IP address A1 and the care of IP address A2 are associated with a home IP address AH (a virtual address).

Moreover, a switching server 100 and the MN 300 are capable of executing communications while using the radio IP network 10A and the radio IP network 10B simultaneously. Specifically, when the bandwidth (the transfer rate) of the radio IP network 10A used in transmission and reception of IP packets is insufficient, the switching server 100 and the M 300 complement the insufficient bandwidth by use of the radio IP network 108.

The radio IP network 10A and the radio IP network 10B are connected to an Internet 20. In addition, a relay center 30 is connected to the Internet 20.

In the relay center 30, a network device that relays IP packets transmitted and received by the MN 300 is provided. Specifically, the switching server 100, and VPN routers 200A and 200B are provided in the relay center 30.

The switching server 100 controls communication paths to the MN 300. In this embodiment, the switching server 100 constitutes a communication control device. Specifically, the switching server 100 is capable of transmitting IP packets to the MN 300 via the radio IP network 10A or the radio IP network 10B.

The VPN routers 200A and 200B execute routing processing for IP packets. In addition, each of the VPN routers 200A and 200B establishes a tunnel with a VPN (IPSec) between the MN 300 and the switching server 100. The virtualization of a third OSI layer is implemented by the establishment of the tunnel, and the IP mobility of the MN 300 is thereby secured.

Specifically, in this embodiment, unlike in the case of Mobile IP (RFC2002, for example), the MN 300 is capable of executing communications with a communication destination (in particular, an IP phone terminal 42) while simultaneously using both of the communication paths respectively set via the radio IP network 10A and the radio IP network 10B.

The relay center 30 (the switching server 100) is connected to a user premises 40 via a predetermined communication network (not shown). An IP phone switching system 41 and the IP phone terminal 42 are provided in the user premises 40. The IP phone switching system 41 relays IP packets (VoIP packets, to be specific) between the predetermined communication network and the IP phone terminal 42. The IP phone terminal 42 mutually converts voice signals and VoIP packets, and also transmits and receives IP packets.

In other words, the MN 300 executes communications with the IP phone terminal 42 (the communication destination) via the switching server 100.

(Functional Block Configuration of Communication System)

Next, a functional block configuration of the communication system 1 will be described. Specifically, descriptions will be given of functional block configurations of the switching server 100 and the MN 300 included in the communication system 1. Note that portions related to the present invention will be mainly described, hereinafter. Accordingly, it is to be noted that there is a case where each of the switching server 100 and the MN 300 includes a logical block (such as a power supply) required to perform functions as the device although such a logical block is not shown in the drawings, or the description thereof is omitted.

(1) Switching Server 100

Figure 2:
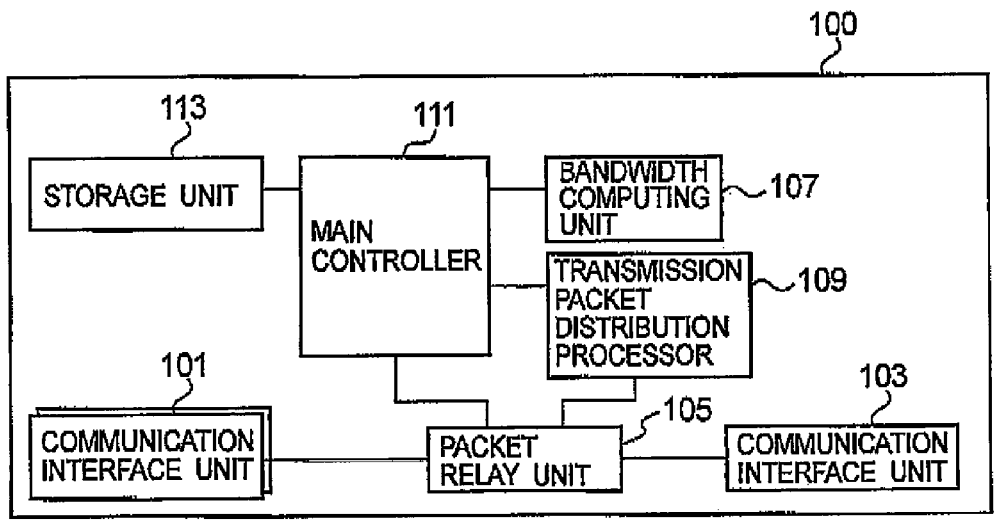
FIG. 2 shows a functional block configuration diagram of a communication control device according to the embodiment of the present invention.

FIG. 2 shows a functional block configuration diagram of the switching server 100. As shown in FIG. 2, the switching server 100 includes a communication interface unit 101, a communication interface unit 103, a packet relay unit 105, a bandwidth computing unit 107, a transmission packet distribution processor 109, a main controller 111 and a storage unit 113.

The communication interface unit 101 is connected to the VPN router 200A and the VPN router 200B. The communication interface unit 101 can be configured of 1000 BASE-T defined by IEEE802.3ab, for example.

Moreover, as described above, in this embodiment, a VPN using IPSec is set, so that an IP packet to be transmitted and received by the communication interface unit 101, that is, a VoIP packet to be transmitted and received between the switching server 100 and the MN 300 (a VoIP packet to be transmitted by the MN 300, to be more specific) includes a configuration shown in FIG. 5(a). As shown in FIG. 5(a), a home IP header (a home IP address AH), a TCP/UDP header and a payload are encapsulated, and a care of IP address (the care of IP address A1 or the care of IP address A2) is added thereto.

Note that an access control packet to be transmitted and received between the switching server 100 and the MN 300 includes a configuration shown in FIG. 5(b). The access control packet is configured of a data link layer header, a care of IP address, a TCP header and a control code. Note that a description of the control code will be given later in detail.

The communication interface unit 103 is used in the execution of communications between the IP phone switching system 41 and the IP phone terminal 42.

The packet relay unit 105 relays IP packets transmitted and received by the communication interface unit 101 and the communication interface unit 103. Specifically, the packet relay unit 105 relays IP packets in accordance with an instruction from the transmission packet distribution processor 109 or the main controller 111. In addition, the packet relay unit 105 includes a jitter buffer which absorbs jitters of IP packets received by the communication interface unit 101 and the communication interface unit 103.

Note that in this embodiment, the packet relay unit 105 constitutes a relay unit that receives IP packets (VoIP packets) transmitted from the MN 300 to the IP phone terminal 42 via the radio IP network 10A at a predetermined cycle (20 ms) and relays the IP packets to the IP phone terminal 42.

The bandwidth computing unit 107 computes bandwidths (transfer rates) of the radio IP network 10A and the radio IP network 10B, required for receiving IP packets from the MN 300. Specifically, the bandwidth computing unit 107 computes bandwidths of the radio IP network 10A and the radio IP network 10B, required for transmitting VoIP packets to be transmitted from the IP phone terminal 42 to the MN 300. Note that the bandwidth computing unit 107 is capable of computing a required bandwidth in accordance with a type of a voice encoding protocol (CODEC) or an encoding rate.

The transmission packet distribution processor 109 executes processing for distributing IP packets transmitted from the communication interface unit 101 via the packet relay unit 105 between the radio IP network 10A and the radio IP network 10B.

Specifically, the transmission packet distribution processor 109 adds the care of IP address A1 to an IP packet including the home IP address AH received from the IP phone terminal 42, on the basis of a complementary bandwidth amount notification message (first downlink transmission control information) received by the main controller 111 from the MN 300. The IP packet including the care of IP address A1 added thereto is transmitted from the communication interface unit 101 to the radio IP network 10A.

In addition, the transmission packet distribution processor 109 adds the care of IP address A2 to the IP packet including the home IP address AH received from the IP phone terminal 42, on the basis of a complementary bandwidth amount notification message (second downlink transmission control information) received by the main controller 111 from the MN 300. The IP packet including the care of IP address A2 added thereto is transmitted from the communication interface unit 101 to the radio IP network 10B.

In this embodiment, the transmission packet distribution processor 109 constitutes a first downlink transmitter and a second downlink transmitter.

The main controller 111 controls the communication paths of IP packets to be transmitted, to the MN 300 and IP packets to be received from the MN 300. Moreover, the main controller 111 executes processing for an access control packet.

Particularly, in this embodiment, the main controller 111 determines whether or not the bandwidth of the radio IP network 10A used for receiving of VoIP packets from the MN 300 is of appropriate size capable of transferring the VoIP packets within a window T1 (a predetermined time period). Specifically, the main controller 111 determines that the bandwidth of the radio IP network 10A is of the size on the basis of the number (the number of already received packets) of VoIP packets received by the packet relay unit 105 from the MN 300 within a window T2 (refer to FIG. 6). In this embodiment, the bandwidth computing unit 107 and the main controller 111 constitute a bandwidth determination unit.

Figure 6:
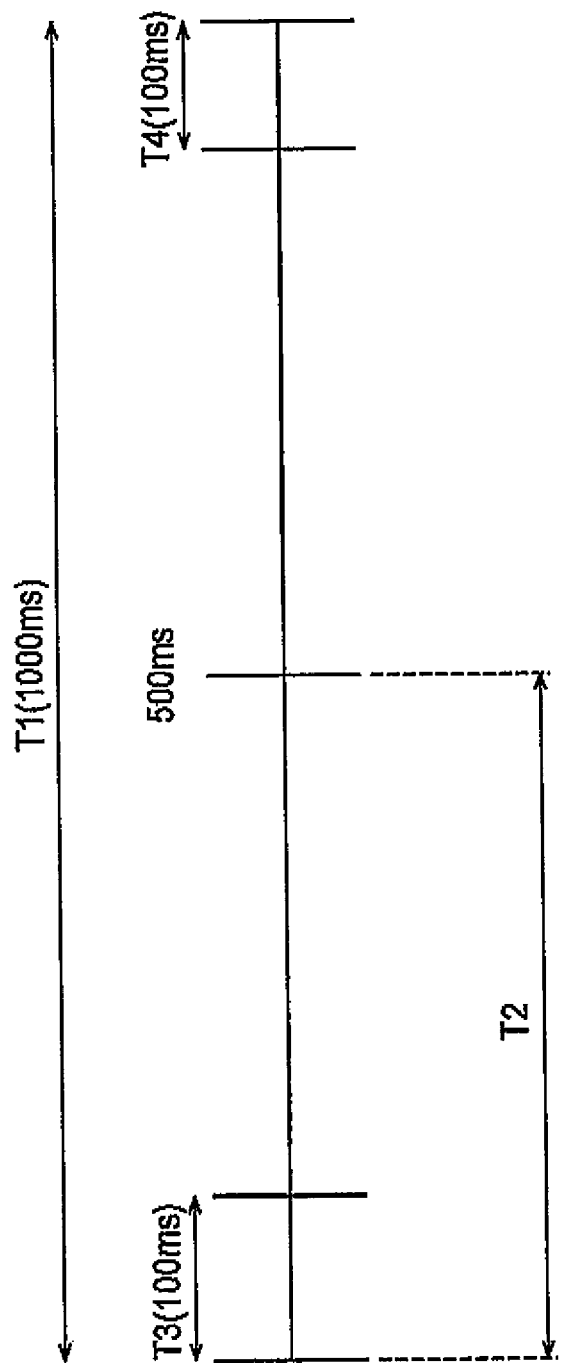
FIG. 6 is a configuration diagram of a window used for determining a complementary bandwidth according to the embodiment of the present invention.

Moreover, the main controller 111 is capable of changing the size of the window T2 (the former half time frame) on the basis of the number of VoIP packets received from the MN 300 within the window T2, that is, on the basis of the number of already received packets. As shown in FIG. 6, the default value of the window T2 is 500 ms.

Specifically, the main controller 111 is allowed to increase the size of the window T2 in a case where the number of packets obtained by subtracting the number of VoIP packets (100 ms/20 ms=5) to be received within a window T3 or a window T4 (100 ms) from the number of VoIP packets (500 ms/20 ms=25) to be received within the window T2 (500 ms, for example) is smaller than the number of already received packets.

Note that the size of the window T3 or the window T4 (a secondary time frame period) is set to be a value not greater than the size of the window T2. Moreover, in this embodiment, the size of the window T3 or the window T4 is set to be 100 ms, and this size coincides with the size of the jitter buffer provided in the packet relay unit 105.

Furthermore, the main controller 111 is allowed to decrease the size of the window T2 in a case where the number of packets obtained by subtracting the number of VoIP packets to be received within the window T3 or the window T4 from the number of VoIP packets to be received within the window T2 is greater than the number of already received packets. Note that a specific method of changing the size of the window T2 will be described later.

Furthermore, when the main controller 111 determines that the bandwidth of the radio IP network 10A used for receiving VoIP packets from the MN 300 is not of a size capable of transferring the VoIP packets within a predetermined time period, the main controller 111 operates as follows. Specifically, the main controller 111 is capable of transmitting a complementary bandwidth amount notification message (a first uplink transmission control information) to the MN 300. This complementary bandwidth amount notification message is a message for causing the number of VoIP packets transmittable by use of this bandwidth within a time frame (the latter half time frame) subsequent to the window T2, that is, within a time period equal to the window T1 minus the window T2 shown in FIG. 6 to be transmitted to the radio IP network 10A.

Moreover, the main controller 111 is also capable of transmitting a complementary bandwidth amount notification message (a second uplink transmission control information) to the MN 300. This complementary bandwidth amount notification message is a message for causing the number of remaining VoIP packets excluding the number of VoIP packets transmittable within the time period equal to the window T1 minus the window T2 to be transmitted to the radio IP network 10B. In this embodiment, the bandwidth computing unit 107 and the main controller 111 constitute the first uplink transmission controller and the second uplink transmission controller.

In addition, the main Controller 111 is also capable of receiving a complementary bandwidth amount notification message (the first downlink transmission control information) from the MN 300. This complementary bandwidth amount notification message is a message for causing the number of VoIP packets transmittable within the time period equal to window T1 minus the window T2 to be transmitted to the radio IP network 10A. Furthermore, the main controller 111 is also capable of receiving a complementary bandwidth amount notification message (the second downlink transmission control information) from the MN 300. This complementary bandwidth amount notification message is a message for causing the number of remaining VoIP packets excluding the number of VoIP packets transmittable within the time period equal to the window T1 minus the window T2 to be transmitted to the radio IP network 108. In this embodiment, the communication interface unit 101 and the main controller 111 constitute a control information receiver.

Note that the complementary bandwidth amount notification message is transmitted and received by use of en access control packet (refer to FIG. 5(b)). Table 1, shows an example of the contents of the access control packet to be transmitted from the MN 300 to the switching Server 100. In addition, Table 2 shows an example of the contents of the access control packet to be transmitted from the switching server 100 to the MU 300.

TABLE 1

Access Control Packet (MN 300 to Switching Server 100)

| Type | Control Code | Name | Processing Content |
|---|---|---|---|
| Communication Interface Change | 0x11 | Interface Switching Request | Switch a communication interface to a communication interface that has received this message, and continue the communications being performed by the switching source as well until an instruction is further issued. Respond to the MN with control code 0x12. |
| Complementary Bandwidth Amount Notification 1 | 0x22 | Bandwidth Complementary Amount Notification Message 1 | Notify the switching server of the complementary bandwidth amount. |
| Complementary Bandwidth Amount Notification 2 | 0x26 | Bandwidth Complementary Amount Notification Message 2 | Notify the switching server that bandwidth complementary processing including retransmission needs to be executed. |
| Reply Request | 0x31 | Copy Reply Request | Reply a received payload as it is with control code 0x32 |
| Response | 0x2C | Bandwidth Complementary Amount Notification Response | Respond to the bandwidth complementary amount notification by use of control code 0x28 |

TABLE 2

Access Control Packet (Switching Server 100 to MN 300)

| Type | Control Code | Name | Processing Content |
|---|---|---|---|
| Response | 0x12 | Interface Change Response | Respond to control code 0x11 |
| | 0x24 | Bandwidth Complementary Amount Notification Response | Respond to control code 0x22 |
| | 0x32 | Copy Response | Respond to control code 0x31 |

TABLE 2-continued

Access Control Packet (Switching Server 100 to MN 300)

| Type | Control Code | Name | Processing Content |
|---|---|---|---|
| Complementary Bandwidth Amount Notification 1 | 0x28 | Complementary Bandwidth Amount Notification Message 1 | Notify MN of the complementary bandwidth amount |
| Complementary Bandwidth Amount Notification 2 | 0x2A | Complementary Bandwidth Amount Notification Message 2 | Notify MN that that bandwidth complementary processing including retransmission needs to be executed. |

Note that the control code is expressed by using the top 1 byte of the payload portion of an access control packet (refer to FIG. 5(b)). Furthermore, the home IP address AH of the MN 300 may be included in the access control packet subsequently to the control code. In a case where the switching server 100 receives an access control packet of a content shown in Table 1 from the MN 300, the switching server 100 transmits an access control packet (a response packet) shown in Table 2 to the MN 300. The payload portion of the access control packet received from the MN 300 is copied onto the access control packet to be transmitted from the switching server 100.

In addition, the main controller 111 checks the sequence of IP packets received via the radio IP network 10A and the radio IP network 10B. In this embodiment, the main Controller 111 checks a sequence number of RTP (real-time transport protocol) included in a VoIP packet to be transmitted and received between the MN 300 and the IP phone terminal 42. In addition, the main controller 111 is capable of acquiring statistic information (packet loss, throughput, and under run count and over run count of a jitter buffer, for example) of IP packets relayed by the packet relay unit 105, and then transmitting the acquired information to the MN 300

The storage unit 113 stores an application program that provides a function of the switching server 100, or the like. In addition, the storage unit 113 stores information related to networks such as the radio IP network 10A and the radio IP network 10B.

In particular, the storage unit 113 stores a home IP address AH of the MN 300, which is associated with the care of IP address A1 and the care of IP address A2 in this embodiment. Specifically, the main controller 111 causes the storage unit 113 to store the care of IP address A1, the care of IP address A2 and the home IP address AH, which are notified by the MN 300. In this embodiment, the main controller 111 and the storage unit 113 constitute a virtual address acquisition unit.

Note that the main controller 111 is capable of verifying the home IP address AH included in an IP packet transmitted from the IP phone terminal 42 with a home IP address registered to a home agent (not shown) accessible via the Internet 20. Through the verification performed by the main controller 111, a determination can be made as to which carrier has assigned the home IP address AH to the MN 300.

(2) NM 300

Figure 3:
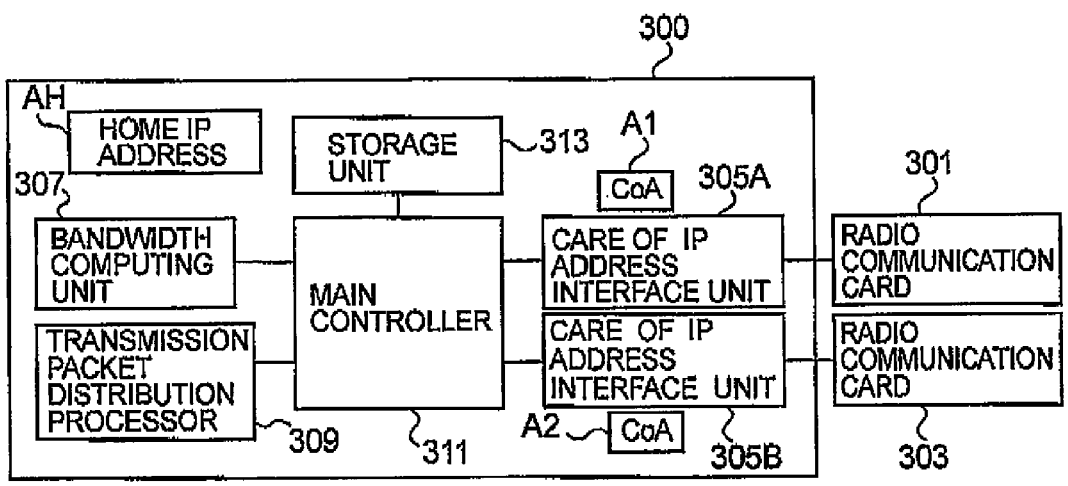
FIG. 3 shows a functional block configuration diagram of a radio communication device according to the embodiment of the present invention.

FIG. 3 shows a functional block configuration diagram of the MN 300. Similarly to the switching server 100, the MN 300 is capable of executing communications while simultaneously using the radio IP network 10A and the radio IP network 10B. Here, the description of the same functional blocks as those of the aforementioned switching server 100 will be omitted as appropriate in the description below.

As shown in FIG. 3, the MN 300 includes a radio communication card 301, a radio communication card 303, a care of IP address interface unit 305A, a care of IP address interface unit 305B, a bandwidth computing unit 307, a transmission packet distribution processor 309, a main controller 311 and a storage unit 313.

The radio communication card 301 executes radio communications compliant with the radio communication scheme used in the radio IP network 10A (HRPD, which is a 3GPP2 standard). In this embodiment, the radio communication card 301 constitutes a receiver that receives IP packets (VoIP packets) transmitted at a predetermined cycle (20 ms, for example) from the IP phone terminal 42 via the radio IP network 10A.

The radio communication card 303 executes radio communications (Mobile WiMAX) compliant with the radio communication scheme used in the radio IP network 10B.

The care of IP address interface unit 305A is connected to the radio communication card 301. The care of IP address interface unit 305A transmits and receives IP packets on the basis of a care of IP address A1 assigned to the MN 300 in the radio IP network 10A.

The care of IP address interface unit 305B is connected to the radio communication card 303. The care of IP address interface unit 305B transmits and receives IP packets on the basis of a care of IP address A2 assigned to the t 300 in the radio IP network 10B.

The bandwidth, computing unit 307 computes bandwidths (transfer rates) of the radio IP network 10A and the radio IP network 10B, required for receiving IP packets from the switching server 100. The specific functions of the bandwidth computing unit 307 are substantially same as those of the aforementioned bandwidth computing unit 107.

The transmission packet distribution processor 309 generates an IP packet including a home IP address AH and a care of IP address A1 on the basis of the complementary bandwidth amount notification message (the first uplink transmission control information) received by the main controller 311 from the switching server 100. The generated IP packet is transmitted to the radio IP network 10A from the main controller 311 via the care of IP address interface unit 305A and the radio communication card 301. In this embodiment, the transmission packet distribution processor 309 constitutes a first uplink transmitter.

In addition, the transmission packet distribution processor 309 generates an IP packet including a home IP address AH and a care of IP address A2 on the basis of the complementary bandwidth amount notification message (the second uplink transmission control information) received by the main controller 311 from the switching server 100. The generated IP packet is transmitted to the radio IP network 10B from the main controller 311 via the care of IP address interface unit 305B and the radio communication card 303. In this embodiment, the transmission packet distribution processor 309 constitutes a second uplink transmitter.

Similarly to the main controller 111 of the switching server 100 (refer to FIG. 2), the main controller 311 controls the communication paths of IP packets to be transmitted to the switching server 100 and IP packets to be received from the switching server 100. Moreover, the main controller 311 executes processing for an access control packet.

The main controller 311 determines whether or not the bandwidth of the radio IP network 10A used for receiving IP packets (particularly, yelp packets) from the switching server 100 is of a size capable of transferring the VoIP packets within the window T1 (the predetermined time period) on the basis of the number of already received VoIP packets received by the radio communication card 301 from the switching server 100 within the window T2. In this embodiment, the bandwidth computing unit 307 and the main controller 311 constitute a bandwidth determination unit.

Furthermore, when the main controller 311 determines that the bandwidth of the radio IP network 10A is not of a size capable of transferring the VoIP packets within the predetermined time period, the main controller 311 adds a care of IP address A1 to the number of VoIP packets transmittable by use of the bandwidth within the time period equal to the window T1 minus the window T2 (refer to FIG. 6), and then transmits the complementary bandwidth amount notification message (the first downlink transmission control information) to the switching server 100. This message is a message for causing the VoIP packets including the care of IP address A1 added thereto to be transmitted to the radio IP network 10A.

Moreover, the main controller 311 adds a care of IP address A2 to the number of remaining VoIP packets excluding the VoIP packets including the care of IP address A1 added thereto, and transmits the complementary bandwidth amount notification message (the second downlink transmission control information) to the switching server 100. This message is a message for causing the VoIP packets including the care of IP address A2 added thereto to be transmitted to the radio IP network 10B.

In this embodiment, the bandwidth computing unit 307 and the main controller 311 constitute a first downlink transmission controller and a second downlink transmission controller.

In addition, the main controller 311 is also capable of receiving the complementary bandwidth amount notification message (the first uplink transmission control information) for causing the number of VoIP packets transmittable within the time period equal to the window T1 minus the window T2 to be transmitted to the radio IP network 10A. Moreover, the main controller 311 is also capable of receiving the complementary bandwidth amount notification message (the second uplink transmission control information) for causing the number of remaining VoIP packet excluding the number of VoIP packets transmittable within the time period equal to the window T1 minus the window T2 to be transmitted to the radio IP network 10B. In this embodiment, the radio communication card 301 and the main controller 311 constitute a control information receiver.

In addition, similarly to the main controller 111 of the switching server 100, the main controller 311 is capable of changing (increasing or decreasing) the size of the window T2.

Moreover, the main controller 311 is capable of acquiring information indicating the quality of radio communications executed with the radio communication card 301 and the radio communication card 303 (such as throughput, SINR, RSSI, DRC and transmission power) and then of predicting the bandwidths (downlink and uplink) of the radio IP network 10A and the radio IP network 108 on the basis of the acquired information.

The storage unit 313 stores an application program that provides a function of the MN 300, or the like. In addition, the storage unit 313 stores a home IP address AH of the MN 300, which is associated with the care of IP address A1 and the care of IP address A2. In this embodiment, the storage unit 313 constitutes a virtual address storage unit.

(Operations of Communication System)

Next, operations of the aforementioned communication system will be described. Specifically, descriptions will be given of: (1) transmission and reception of an IP packet (a VoIP packet) between the switching server 100 and the MN 300; (2) determination on whether or not the bandwidth needs to be complemented by use of the radio IP network 10B; (3) distribution of IP packets (VoIP packets) between the radio IP network 10A and the radio IP network 10B; and (4) changing of a time period (window T2) for determining whether or not to complement the bandwidth.

(1) Transmission and Reception of IP Packets between Switching Server 100 and MN 300.

Figure 4:
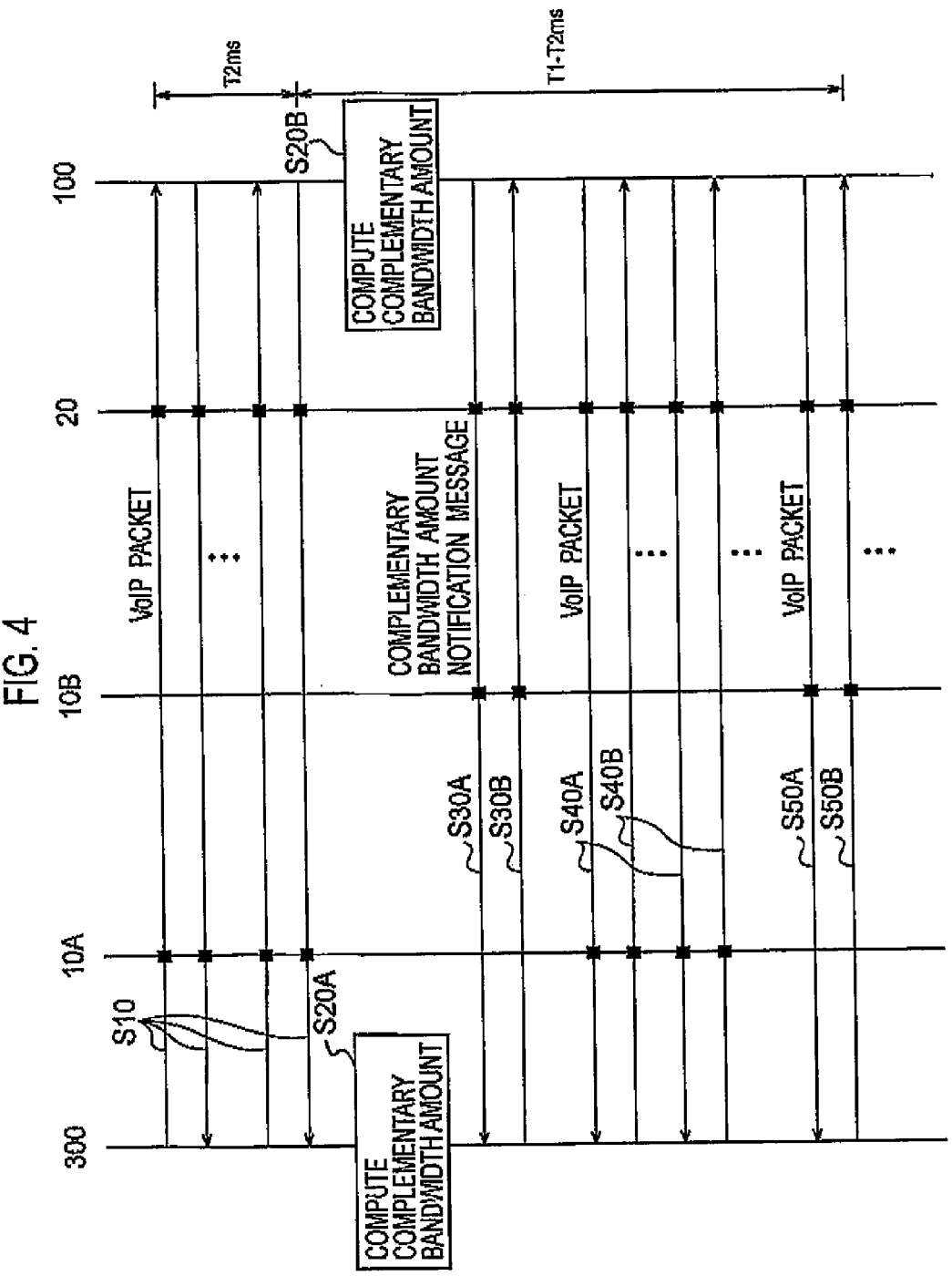
FIG. 4 is a communication sequence diagram of communications executed between a communication control device and a radio communication device according to the embodiment of the present invention.

FIG. 4 is a sequence diagram of communications executed between the Switching server 100 and the MN 300. As shown in FIG. 4, the switching server 100 and the MN 300 transmit and receive VoIP packets in step S10. Note that the VoIP packets are transmitted and received accompanied by a voice call between the MN 300 and the IP phone terminal 42 (refer to FIG. 1).

Figure 5:
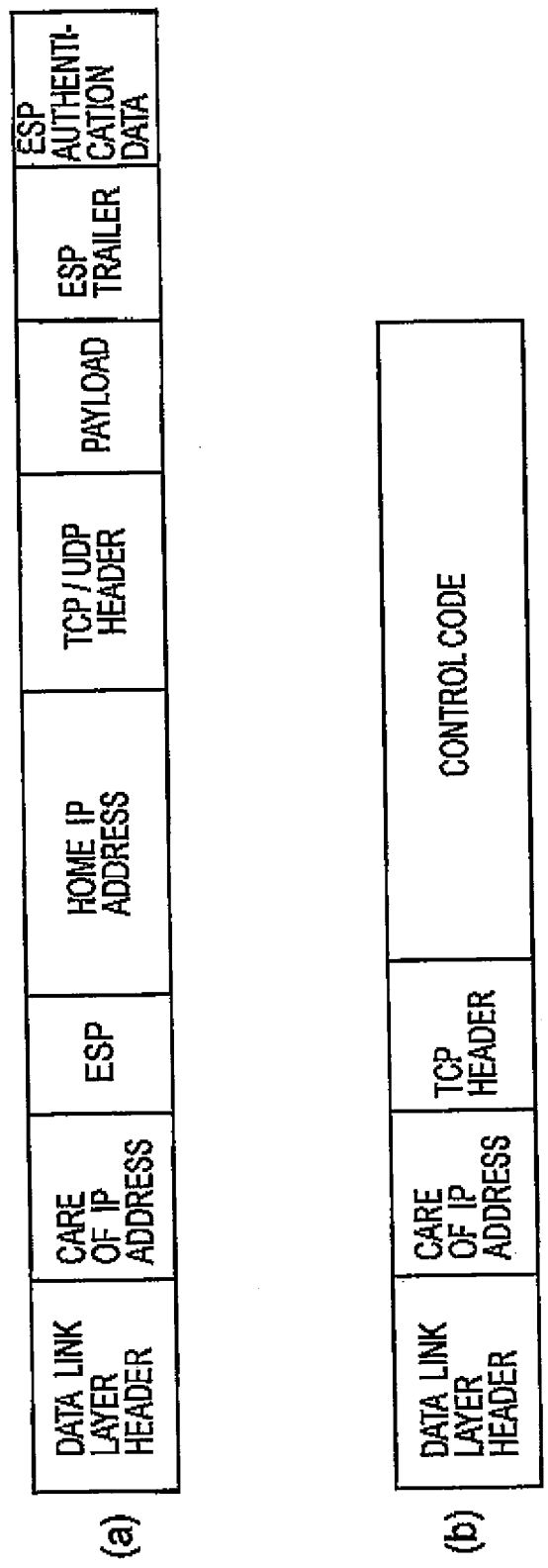
FIG. 5 shows configuration diagrams of IP packets according to the embodiment of the present invention.

Specifically, the MN 300 transmits IP packets (refer to FIG. 5(*a*)) in each of which a payload including an IP address assigned to the IP phone terminal 42 and a home IP address AH are encapsulated, and the care of IP address A1 is set as the transmission source address.

Moreover, the switching server 100 transmits IP packets in each of which the VoIP packet transmitted from the IP phone terminal 42 is encapsulated and the care of IP address A1 is set as the destination address.

Note that "filled-in square" marks in the drawing are placed at the networks through which a VoIP packet is transmitted (the same applies to the description below). In step S10, all of the VoIP packets are transmitted via the radio IP network 10A and the Internet 20.

In step S20A, the MN 300 computes the amount of bandwidth of "downlink" to be complemented by use of the radio IP network 10B. Moreover, in step S20B, the switching server 100 computes the amount of bandwidth of "uplink" to be complemented by use of the radio IP network 10B. In steps S20A and S20B, each amount of bandwidth to be complemented is computed on the basis of the number of VoIP packets received within the window T2 (refer to FIG. 6) (the number of already received packets). Note that a specific method of computing the amount of bandwidth to be complemented will be described later.

In step S30A, the switching server 100 transmits a complementary bandwidth amount notification message (the first uplink transmission control information and the second uplink transmission control information) to the MN 300 on the basis of the computation result of the amount of bandwidth of "uplink" to be complemented.

In step S30B, the MN 300 transmits complementary bandwidth amount notification messages (the first downlink transmission control information and the second downlink transmission control information) to the switching server 100 on the basis of the computation result of the amount of bandwidth of "downlink" to be complemented.

In step S40A, the switching server 100 transmits the number of VoIP packets transmittable within the time period equal to the window T1 minus the window T2 (refer to FIG. 6) to the radio IP network 10A on the basis of a complementary bandwidth amount notification message (the first downlink transmission control information) received from the MN 300.

In Step S40B, the MN 300 transmits the number of VoIP packets transmittable within a time period equal to the window T1 minus the window T2 to the radio IP network 10A on the basis of a complementary bandwidth amount notification message (the first uplink transmission control information) received from the switching server 100.

In step S50A, the switching server 100 transmits the number of remaining VoIP packets excluding the number of VoIP packets transmittable within the time period equal to the window T1 minus the window T2 to the radio IP network 10B on the basis of the complementary bandwidth amount notification message (the second downlink transmission control information) received from the MN 300.

In step S50B, the MN 300 transmits the number of remaining to VoIP packets excluding the number of VoIP packets transmittable within the time period equal to the window T1 minus the window T2 to the radio IP network 10B on the basis of the complementary bandwidth amount notification message (the second uplink transmission control information) received from the switching server 100.

In steps S50A and S50B, VoIP packets are transmitted through the radio IP network 10B and the Internet 20 (refer to filled-in squares in the drawing). Specifically, the bandwidth required for transmitting the number of remaining VoIP packets excluding the number of VoIP packets transmittable within the time period equal to the window T1 minus the window T2 is complemented by the radio IP network 10B.

(2) Determination on Whether or Not Bandwidth Needs to be Complemented by Radio IP Network 10B

As described above, by use of the windows shown in FIG. 6, the switching server 100 and the MN 300 determine whether or not the bandwidth needs to be complemented. As shown in FIG. 6, the window T1 is set to be 1,000 ms in this embodiment. The default value of the window T2 (the former half time frame) is set to be a value of 500 ms, which is in a half size of the window T1. In other words, the default value of the time period equal to the window T1 minus the window T2 (the latter half time frame) is also set to be 500 ms.

Hereinafter, a description will be given of a case where the determination as to whether or not the bandwidth needs to be complemented is made by the switching server 100, as an example. Note that in the MN 300, the same determination is made as in the case of the switching server 100.

(a) The switching server 100 counts the VoIP packets received from the MN 300 within the window T2. Note that the window T2 is used as the threshold value for making a determination whether or not the bandwidth needs to be complemented and for computing the bandwidth to be complemented by the radio IP network 10B. The size of the window T2 is changed as appropriate as will be described later.

(b) An allowable time period for jitter buffering is set as $t_{jit}$ (100 ms, for example). The frame length of a real-time application (VoIP in this embodiment) to be used is set as $T_f$ (20 ms). In addition, the number of VoIP packets received within the window T2 is set as Ct.

(c) Since the number of VoIP packets equal to $T2/T_f$ (500/20=25) can be received within the window T2, if the number of VoIP packets Ct (21 packets, for example) are received at the end timing of the window T2, this means that the transferring of the number of VoIP packets equal to $(T2/T_f-Ct)$ is delayed.

(d) Since the MN 300 has already transmitted the number of VoIP packets equal to $T2/T_f$ (25 packets, for example) within the window T2, that is, within 500 ms, the switching server 100 determines whether or not the delayed VoIP packets (4 packets, for example) can be received within the time period equal to the window T1 minus the window T2 on the basis of formula (1) in a case where the number of VoIP packets Ct (21 packets, for example) are received at the end timing of the window T2.

$$\text{If } ((T1-T2)/T2 * Ct) \geq T2/T_f - Ct \quad (1) \text{ is true,}$$

Then, retransmission of VoIP packets is determined to be unnecessary, and the bandwidth to be complemented is computed, Else retransmission of VoIP packets is determined to be necessary, and the bandwidth to be complemented is computed.

(e) If retransmission of VoIP packets is determined to be unnecessary, this means that the number of VoIP packets equal to $(T2/T_f-Ct)$ is delayed in the window T2. It is thus predicted that the number of VoIP packets equal to $(T2/T_f-Ct)*T1/T2$ is delayed within the time period equal to the window T1 minus the window T2. Since the number of VoIP packets equal to Ct (21 packets, for example) is received within the window T2 via the radio IP network 10A, an assumption can be made that the number of VoIP packets equal to $Ct*T1/T2$ (rounding off decimals) is receivable within the window T1. Accordingly, the number of VoIP packets that cannot be transmitted within the window T1 via the radio IP network 10A is equal to $T1/T_f - Ct*T1/T2$ (rounding off decimals). The number of VoIP packets to be found by this formula is the bandwidth to be complemented by use of the radio IP network 10B. The switching server 100 transmits a complementary bandwidth amount notification message (specifically, a complementary bandwidth amount notification message 1 shown in Table 2) including information (the number of VoIP packets, for example) indicating the bandwidth thus found to the MN 300.

(f) Note that if all the VoIP packets to be transmitted is considered to be transmittable within the window T1, the size of the window T2 can be increased, so that the calculation accuracy of the complementary bandwidth can be improved. Moreover, if the bandwidth of the radio IP network 10A currently used in transmission and reception of the VoIP packets largely decreases, the size of is the window T2 is reduced. In other words, the size of the window T2 has to be reduced at this point; otherwise, there may be a case where the appropriate number of VoIP packets cannot be transmitted to the radio IP network 10B, since it is too late for the size of the window T2 to be reduced at the point when the switching server 100 computes the compensation bandwidth.

(g) The variable range of the window T2 is set to be from the window T3 to the value equal to (the window T1 minus the window T4), that is, from 100 ms to 900 ms. In addition, the following is true in this embodiment, window T3=window T4=$t_{jit}$. The switching server 100 uses a jitter buffer time $t_{jit}$ as a sub-window (sub-time frame). In addition, the switching server 100 uses the number of VoIP packets to be received within this sub-window as the threshold value and changes the size of the window T2 as a unit of sub-window size.

Note that the size (the time period) of a sub-window is set to be the size of jitter butter in this embodiment. Thereby, in a case where there is an error between the computing result of the complementary bandwidth and the actual bandwidth (the transfer rate), the error can be absorbed by the jitter buffer. Note that an example of changing the size of the window T2 will be described later.

(h) Specifically, the switching server 100 changes the size of the window T2 on the basis of a series of formulae (flows) shown below.

```
        k = 1
          If T2/T_f - (k * t_jit/T_f) < Ct ...(2)
              If T2 = T1 - T4
                  Then T2 = T2 (T2 is not changed since T2 is the
    upper limit value)
                  Stop
              Else T2 = T2 + t_jit (example: T2 + 100 ms) ...(3)
                  Stop
              Else If T2/T_f - (k+1) * (t_jit/T_f)
                     < Ct < T2/ T_f - (k * t_jit/T_f) ...(4)
                  If T2 = T3
                      Then T2 = T2 (T2 is not changed since T2 is the
    lower limit value)
                      Stop
                  Else T2 = T2 - k * t_jit (example: k * 100 ms)...(5)
                      Stop
              Else k = k + 1...(6)
                  If k = T2/t_jit - 1(T2/ T_f - (k + 1) * t_jit/T_f = 0)
                      Then Stop (complement all of the bandwidth with
    the radio IP network 10B)
                      Else Go to (4)
```

(i) In a case where the determination is made that retransmission of VoIP packets is necessary, the number of VoIP packets equal to $(T2/T_f - Ct) - ((T1-T2)/T2*Ct)$ need to be tracked back and retransmitted by use of the radio IP network 10B. In the switching server 100, the VoIP packets transmitted in the past window T1 are buffered. The switching server 100 needs to track back to the last VoIP packet among the number of buffered VoIP packets equal to $(T2/T_f - Ct) - ((T1-T2)/T2*Ct)$, and to cause the applicable VoIP packets to be transmitted from the MN 300 by use of the radio IP network 10B.

(j) The number of VoIP packets to be transmitted within the time period equal to the window T1 minus the window T2 by use of the radio IP network 10B is equal to $T1/T_f - Ct*T1/T2 + (T2/T_f - Ct) - ((T1-T2)/T2*Ct)$. The number of VoIP packets found by use of this formula is the bandwidth to be complemented by use of the radio IP network 10B. The switching server 100 transmits a complement bandwidth amount notification message (specifically, the complement bandwidth amount notification message 2 shown in Table 2) including information (the number of VoIP packets, for example) indicating the bandwidth thus found to the MN 300. Moreover, in this case, the switching server 100 decreases the size of the window T2 in order to optimize the size of the window T2.

(3) Distribution of IP Packets

Next, a description will be given of a distribution method of IP packets (VoIP packets) between the radio IP network 10A and the radio IP network 10B. Hereinafter, the description will be given of a case where IP packets are distributed by the switching a server 100 as an example. Note that IP packets can be distributed by the MN 300 as in the case of the switching server 100.

The switching server 100 absorbs and temporarily saves the VoIP packets transmitted within the window T1. The reason for temporarily saving the VoIP packets is that there may be a case where retransmission of the VoIP packets via the radio IP network 10B becomes necessary when the bandwidth is to be complemented.

The switching server 100 transmits VoIP packets by use of the radio IP network 10A in a predetermined cycle (20 ms). Moreover, upon receipt of a complementary bandwidth amount notification message from the MN 300, the switching server 100 distributes VoIP packets between the radio IP network 10A and the radio IP network 10B in the following manner.

(3.1) Case where Complementary Bandwidth Amount Notification Message 1 is Received The complementary bandwidth amount notification message 1 includes the number ($N_{COMP}$) of VoIP packets to be complemented by the radio IP network 10B. The switching server 100 extracts the number of VoIP packets equal to $N_{COMP}$ starting from the last part of transmission queue for the radio IP network 10A. Moreover, the switching server 100 adds the number of extracted VoIP packets equal to $N_{COMP}$ to the transmission queue for the radio IP network 10B, which is used for complementing the bandwidth.

Note that the VoIP packets remaining in the transmission queue for the radio IP network 10A are transmitted to the radio IP network 10A.

(3.2) Case where Complement Bandwidth Amount Notification Message 2 is Received

In addition to $N_{COMP}$, the complementary bandwidth amount notification message 2 includes the number of VoIP packets ($N_{reTX}$) to be retransmitted by the radio IP network 10B. The switching server 100 extracts the number of VoIP packets equal to $N_{reTX}$ starting from the last part of the transmission queue for the radio IP network 10A. Moreover, the switching server 100 adds the number of extracted VoIP packets equal to $N_{reTX}$ to "the top portion" of transmission queue for the radio IP network 10B, which is used for complementing the bandwidth.

Next, the switching server 100 extracts the number of VoIP packets equal to $N_{COMP}$ from the last part of the transmission queue for the radio IP network 10A. Moreover, the switching server 100 adds the number of extracted VoIP packets equal to $N_{COMP}$ to the "last part" of the transmission queue for the radio IP network 10B, which is used for complementing the bandwidth.

(4) Changing of Determination Time Period (Window T2) for Bandwidth Complementation Next, a description will be given of a method of changing a determination period for bandwidth complementation, that is, a method of changing a size of the window T2 (refer to FIG. 6). Specifically, the description will be given of a method of changing the size of the window T2 in the following cases: (1) where the communication condition is good; (2) where the communication condition is poor; (3) where the communication path shifts to the radio IP network used for bandwidth complementation completely; (4) and where VoIP packets are retransmitted.

Hereinafter, the description will be given of a case where the size of the window T2 is changed in the switching server 100 as an example. Note that the size of the window T2 can be changed in the MN 300 as in the case of the switching server 100.

In addition, the following assumptions are made in the description below; $T_f$=20 ms, window T1=1,000 ms, and windows T3 and T4 ($t_{jit}$)=100 ms. Moreover, the default value of the window T2 is to be 500 ms.

(4.1) Case where Communication Condition is Good

Figure 7:
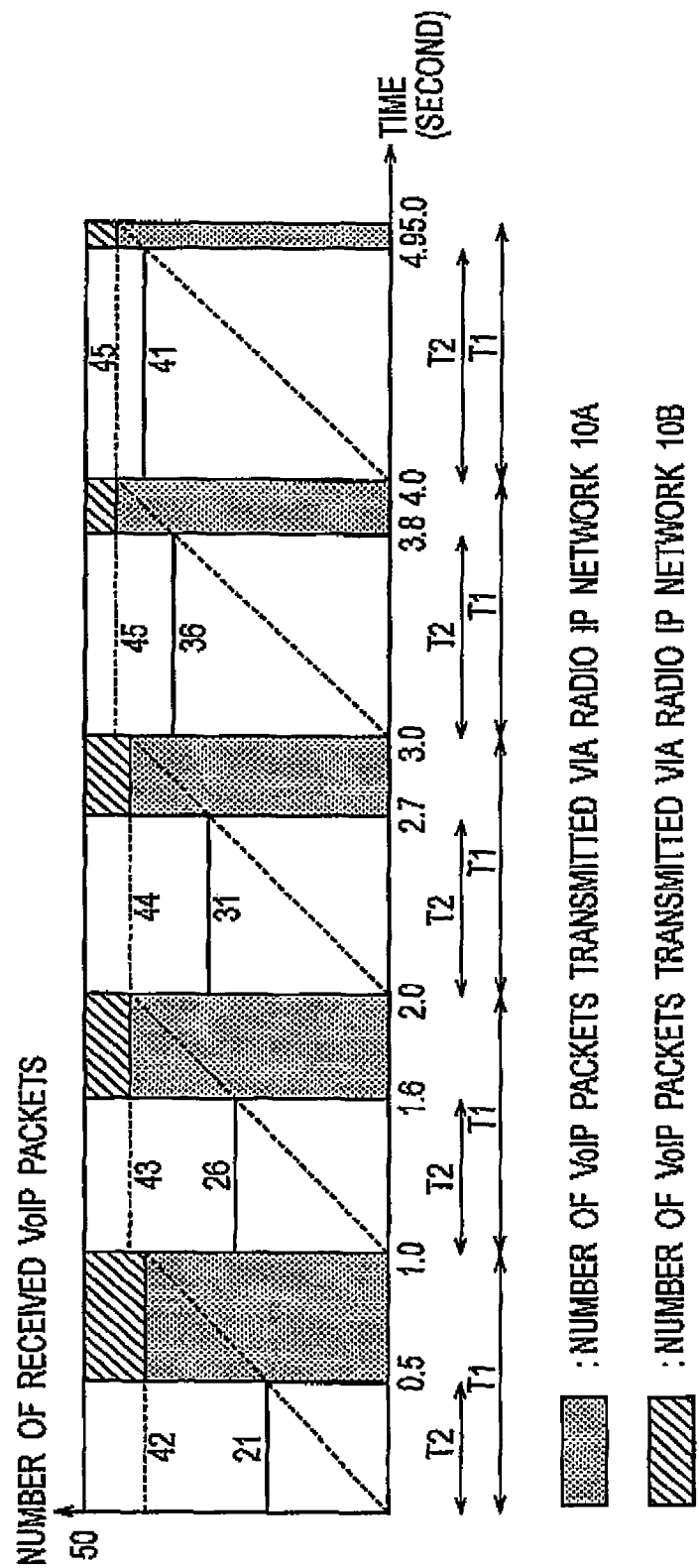
FIG. 7 is a diagram showing an example of changing a size of the window used for determining a complementary bandwidth according to the embodiment of the present invention.

FIG. 7 shows an aspect where the size of the window T2 is changed in accordance with the number of VoIP packets received by the switching server 100 from the MN 300. Were, an assumption is made that the condition of communications between the switching server 100 and the MN 300 via through the radio IP network 10A is good.

As shown in FIG. 7, the switching server 100 receives 21 VoIP packets in the first window T2. The switching server 100 thus determines that 21 VoIP packets can be received in the remaining window T1 (the window T1 minus the window T2) as well.

Accordingly, the switching server 100 computes the bandwidth (the number of VoIP packets) to be complemented by use of the radio IP network 10B within the time period equal to the window T1 minus the window T2 in the following manner.

$$T1/T_f - Ct*T1/T2 = 1000/20 - 21*1000/500 = 8 \text{ packets}$$

Furthermore, since Ct is equal to 21, the aforementioned formula (2) is satisfied. For this reason, the window T2 is set to be 600 ms in the next window T1 on the basis of the formula (3). Moreover, since the formula (2) is satisfied in the next window T1 and so forth, the size of the window T2 increases up to 900 ms (the upper limit).

On the other hand, the bandwidths to be complemented by use of the radio IP network 10B are sequentially reduced from 8 packets to 5 packets. Ct is equal to 41 at the point when the size of the window T2 has become 900 ms. Specifically, the switching server 100 computes the bandwidth to be complemented by use of the radio IP network 10B in the following manner.

$$1000/20 - 41*/000/900 = 5 \text{ packets (rounding off decimals)}$$

(4.2) Case where Communication Condition is Poor

Figure 8:
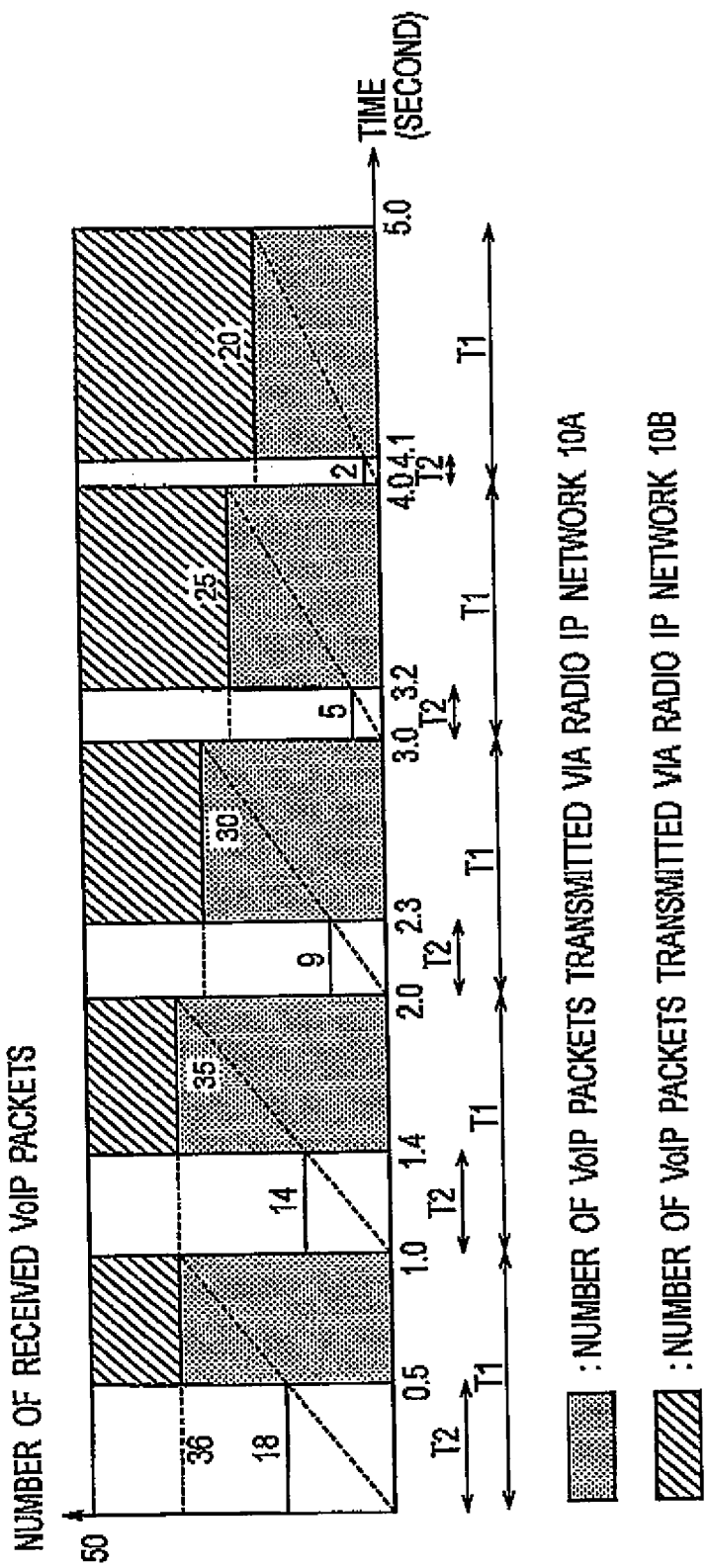
FIG. 8 is a diagram showing another example of changing a size of the window used for determining a complementary bandwidth according to the embodiment of the present invention.

In FIG. 8, an assumption is made that the condition of communications between the switching server 100 and the MN 300 via the radio IP network 10A is poor. As shown in FIG. 8, the size of the window T2 is gradually reduced since the condition of communications between the switching server 100 and the MN 300 via the radio IP network 10A is poor.

In the first window T2, the switching sever 100 receives 18 VoIP packets. Accordingly, the switching server 100 determines that the bandwidth to be complemented by use of the radio IP network 10B in the time period equal to the window T1 minus the window T2 is 14 packets.

In addition, since Ct is equal to 18, the aforementioned formula (2) is not satisfied, but the aforementioned formula (4) is satisfied. For this reason, the window T2 is set to be 400 ms in the next window T1 on the basis of the formula (5). Moreover, since the formula (4) is satisfied in the next window T1 and so forth, the size of the window T2 is reduced down to 100 ms (the lower limit value).

At the point where the size of the window T2 has become 100 ms, Ct is equal to 2. Specifically, the switching server 100 computes the bandwidth to be complemented by use of the radio IP network 10B in the following manner.

$$1000/20 - 2*1000/100 = 30 \text{ packets (rounding off decimals)}$$

Figure 9:
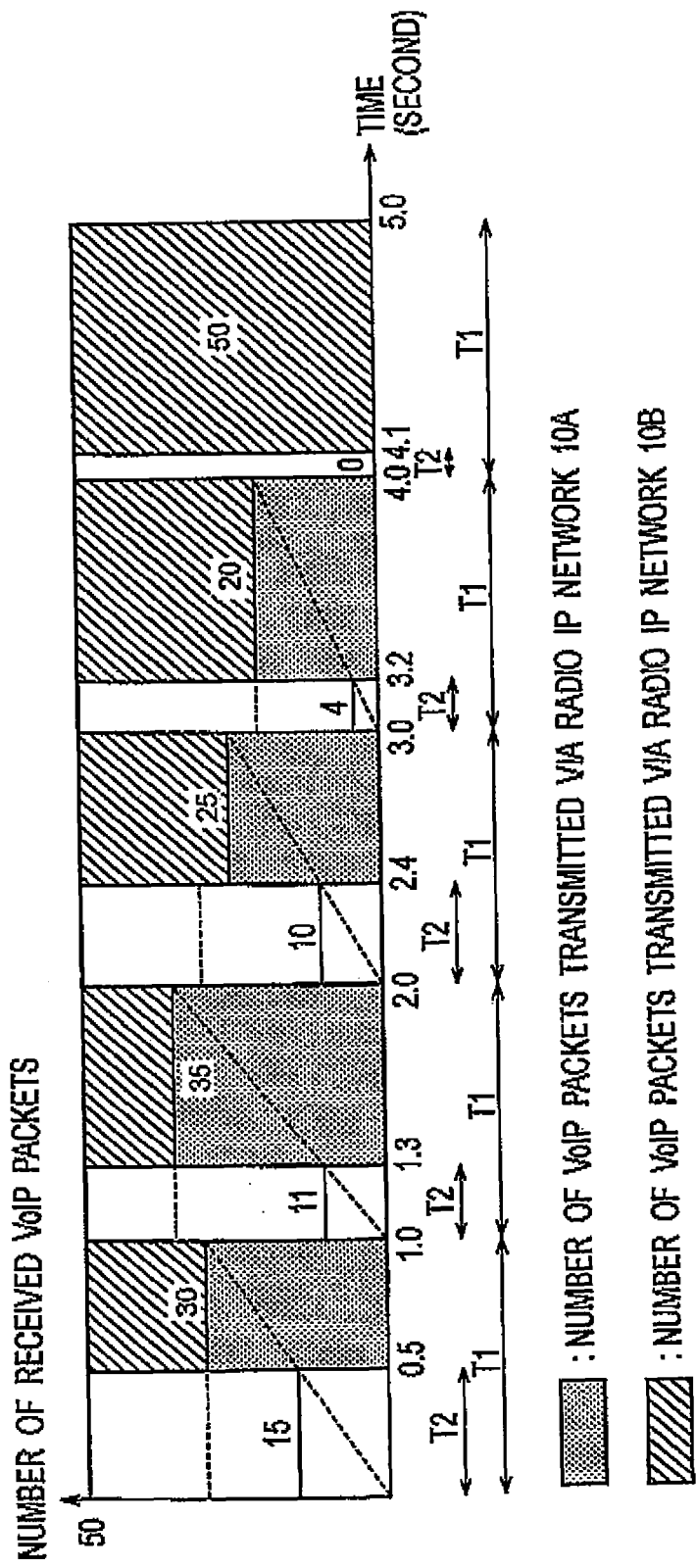
FIG. 9 is a diagram showing yet another example of changing a size of the window used for determining a complementary bandwidth according to the embodiment of the present invention.

(4.3) Case where Shifting to Radio IP Network used for Bandwidth Complementation Completely FIG. 9 shows an aspect where the size of the window T2 is changed in a case where the switching server 100 completely shifts (switches) from the radio IP network 10A to the radio IP network 10B used for bandwidth complementation.

As shown in FIG. 9, the switching server 100 receives 15 VoIP packets in the first window T2. In this case, since the formulae (2) and (4) are not satisfied where k=1, the value of k is incremented, by the formula (6). The formula (4) is satisfied where k=2.

Specifically, the switching server 100 determines that VoIP packets to be received within a time period equal to twice the jitter buffer (100 ms) cannot be received. For this reason, the switching server 100 decreases the size of the window T2 to 300 ms on the basis of the formula (5). Moreover, the switching server 100 computes the bandwidth to be complemented by use of the radio IP network 10B in the time period equal to the window T1 minus the window T2 in the following manner.

$$1000/20 - 15*1000/500 = 20 \text{ packets}$$

In the next window T2 (300 ms), Ct becomes 11 and the formula (2) is satisfied. For this reason, the window T2 is set to be 400 ms on the basis of the formula (3) in the next window T1.

Furthermore, in the next window T2 (400 ms) Ct is equal to 10. In this case, since the formulae (2) and (4) are not satisfied where k=1, the value of k is incremented by the formula (6). The formula (4) is satisfied where k=2. The switching server 100 thus decreases the size of the window T2 to be 200 ms on the basis of the formula (5).

In addition, in the next window T2 (200 ms), Ct is equal to 4. In this case, the formula (2) is not satisfied, but the formula (4) is satisfied. The switching server 100 thus decreases the size of the window T2 to be 100 ms on the basis of the formula (5). Here, the switching server 100 computes the bandwidth (the number of the VoIP packets) to be complemented by use of the radio IP network 10B in the time period equal to the window T1 minus the window T2 in the following manner.

$$1000/20 - 4*1000/200 = 30 \text{ packets}$$

Moreover, in the next window T2 (100 ms), Ct is equal to 0, so that all of the bandwidth is complemented by use of the radio IP network 10B. In other words, the communication path between the switching server 100 and the MN 300 completely shifts from the radio IP network 10A to the radio IP network 10B.

(4.4) Case where VoIP Packets are Retransmitted

Figure 10:
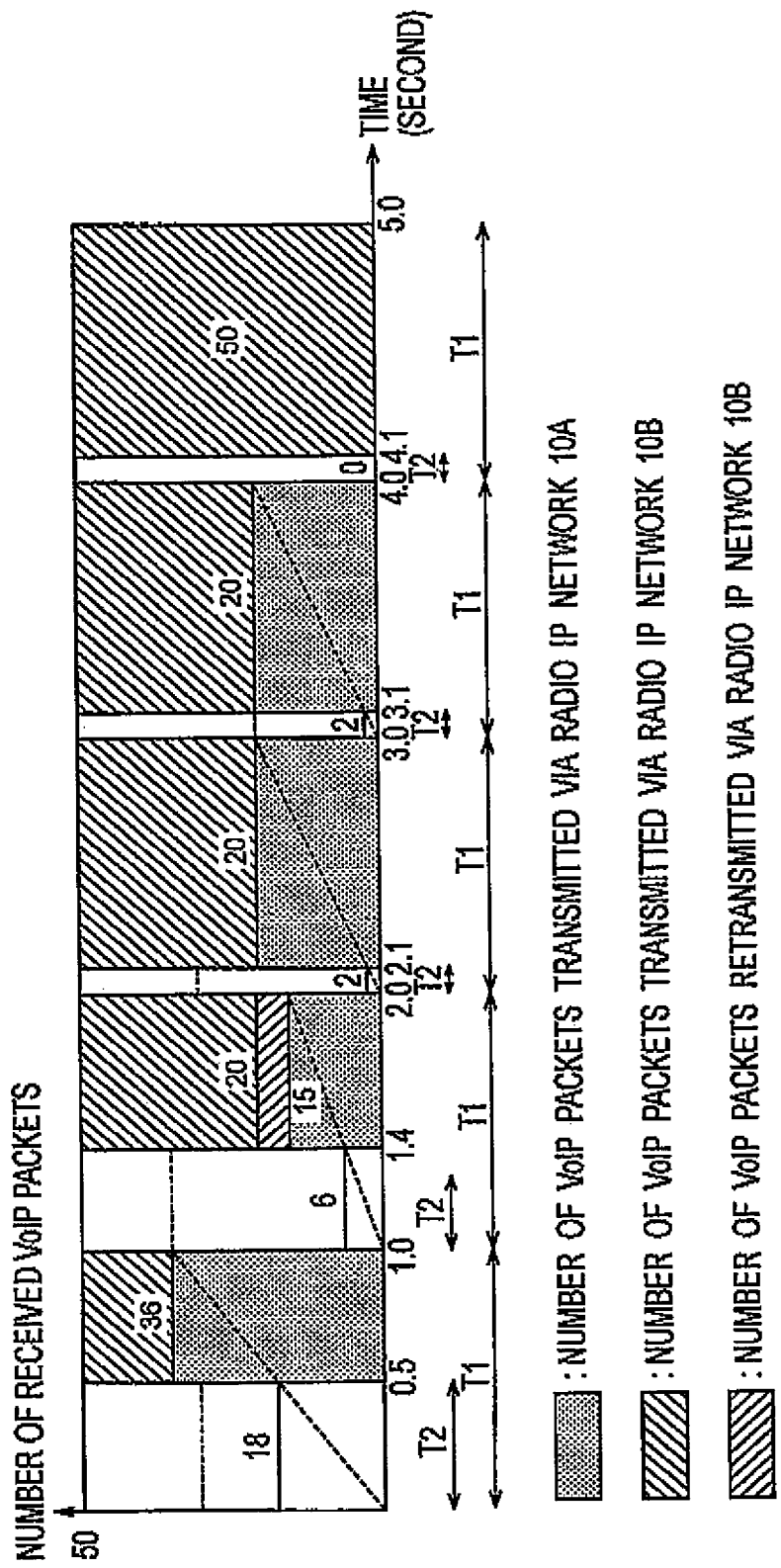
FIG. 10 is a diagram showing still another example of changing a size of the window used for determining a complementary bandwidth according to the embodiment of the present invention.

FIG. 10 shows an aspect where the size of the window T2 is changed when the switching server 100 retransmits the VoIP packets by use of the radio IP network 10B, the VoIP packets being transmitted by use of the radio IP network 10A.

As shown in FIG. 10, the switching server 100 receives 18 VoIP packets in the first window T2. In this case, the formula (2) is not satisfied, but the formula (4) is satisfied. The switching server 100 thus decreases the size of the window T2 to be 400 ms on the basis of the formula (5). In addition, the switching server 100 determines that the bandwidth to be complemented by use of the radio IP network 10B in the time period equal to the window T1 minus the window T2 is 14 packets.

In the next window T2 (400 ms), Ct is equal to 6, and the formula (1) is not satisfied. Accordingly, the switching server 100 determines that the VoIP packets that have already been transmitted by use of the radio IP network 10A need to be retransmitted by use of the radio IP network 10B. Since Ct is equal to 6 in the window T2 (400 ms), the number of VoIP packets transmittable within the window T1 by use of the radio IP network 10A is 15 packets (=6*1000/400).

In the window T2 (400 ms), 20 (=400/20) VoIP packets are already transmitted, by use of the radio IP network 10A. For this reason, among the 20 VoIP packets, 5 VoIP packets are not delivered within the window T1. Accordingly, the switching server 100 retransmits the 5 VoIP packets by use of the radio IP network 10B. Furthermore, the switching server 100 transmits 30 VoIP packets by use of the radio IP network 10B.

Effects and Advantages

According to the switching server 100, in a case where the bandwidth of the radio IP network 10A used for receiving VoIP packets from the MN 300 is determined to be of the size not capable of transferring VoIP packets within a window T1, a complementary bandwidth amount notification message (the first uplink transmission control information) is transmitted to the MN 300. This message causes the number of VoIP packets transmittable within the time period equal to the window T1 minus the window T2 by use of the bandwidth of the radio IP network 10A to be transmitted to the radio IP network 10A.

Moreover, a complementary bandwidth amount notification message (the second uplink transmission controller) is transmitted to the MN 300. This message causes the number of remaining VoIP packets excluding the number of VoIP packets transmittable within the time period equal to the window T1 minus the window T2 by use of the radio IP network 10A to be transmitted to the radio IP network 10B.

Accordingly, when the bandwidth of a radio IP network used in execution of communications is insufficient, the insufficient bandwidth can be complemented by use of a different radio IP network while the multiple radio IP networks are used simultaneously. In other words, it is possible, to use the multiple radio IP networks "seamlessly," rather than to simply switch the radio IP networks from one another.

Moreover, the care of IP address A1 assigned to the MN 300 in the radio IP network 10A and the care of IP address A2 assigned to the MN 300 in the radio IP network 10B are associated with a home IP address AH in the MN 300, so that the MN 300 is capable of executing communications by use of the multiple care of IP addresses simultaneously.

In addition, according to the switching server 100, VoIP packets are distributed between the radio IP network 10A and the radio IP network 10B on the basis of complementary bandwidth amount notification messages (the first downlink transmission control information and the second downlink transmission control information) received from the MN 300. Thus the switching server 100 can securely transmit VoIP packets to the MN 300 while complementing an insufficient bandwidth in the radio IP network 10A by use of the radio IF network 10B.

Note that as described above, while the switching server 100 executes monitoring of a communication condition (delay time) in uplink, and distribution of downlink VoIP packets, the MN 300 executes monitoring of a communication condition (delay time) in downlink and distribution of uplink VoIP packets in the same manner as that of the switching server 100. In other words, according to the communication system 1 including the switching server 100 and the MN 300, when the bandwidth of a radio IP network used in execution of communications is insufficient, the insufficient bandwidth can be complemented by another radio IP network in both uplink and downlink while the multiple radio IP networks are used simultaneously.

In addition, according to the switching server 100 and the MN 300, the size of the window T2 can be appropriately changed in accordance with the number of VoIP packets having already been received, so that the bandwidth to be complemented by use of the radio IP network 1038 can be more securely computed.

Other Embodiments

As described above, the content of the present invention has been disclosed through one embodiment of the present invention. However, the descriptions and the drawings constituting a part of the disclosure should not be construed to limit the present invention. Various alternative embodiments should be obvious to those skilled in the art from this disclosure.

For example, although the communication system 1 includes the radio IP network 10A and the radio IP network 10B, a greater number of radio IP networks may be employed.

Furthermore, although the size of the window T2 is changed in an adaptive manner in the foregoing embodiment, the size of the window T2 may be fixed to be a predetermined size (500 ms, for example).

Moreover, although an insufficient bandwidth is complemented in both of the downlink and the uplink in the aforementioned embodiment, it is also possible to employ a configuration in which an insufficient bandwidth in only one of the downlink and the uplink is complemented.

In addition, the aforementioned radio communication card 301 (or the radio communication card 303), for example, may be a built-in radio unit in the radio communication device.

As described, the present invention includes various embodiments not described herein, as a matter of course. The technical scope of the present invention is thus defined only by invention identifying matters according to the scope of claims appropriate to the descriptions above.

It is to be noted that the entire contents of Japanese Patent Application No. 2006-089133 (filed on Mar. 28, 2006) are incorporated herein by reference.

INDUSTRIAL APPLICABILITY

As has been described, the communication control device, the radio communication device, the communication control method and the radio communication method according to the present invention are advantageous in radio communications such as mobile communications since they are capable of complementing an insufficient bandwidth of a radio IP network used in execution of communications by another radio IP network when the bandwidth of the radio IP network is insufficient, while using the multiple radio IP networks simultaneously.

The invention claimed is:

1. A communication control device that controls a communication path to a radio communication device by use of a first radio IP network in which a first care of IP address is dynamically assigned to the radio communication device in accordance with a position of the radio communication device, and of a second radio IP network in which a second care of IP address is assigned to the radio communication device, the communication control device comprising:

a processor configured to receive an IP packet transmitted from the radio communication device to a communication destination via the first radio IP network in a predetermined cycle, and to relay the IP packet to the communication destination;

to determine whether or not a bandwidth of the first radio IP network used for receiving the IP packet from the radio communication device is of a size capable of transferring the IP packet within a predetermined time period, based on a number of already received IP packets that have been received from the radio communication device within a former half time frame;

to transmit first uplink transmission control information to the radio communication device in a case where it is determined that the bandwidth is not of a size capable of transferring the IP packet within the predetermined time period, the first uplink transmission control information indicating an instruction to transmit, to the first radio IP network, IP packets as many as a number transmittable by use of the bandwidth within a latter half time frame subsequent to the former half time frame; and
to transmit second uplink transmission control information to the radio communication device, the second uplink transmission control information indicating an instruction to transmit, to the second radio IP network, a remaining number of IP packets excluding the number of IP packets transmittable within the latter half time frame.

2. The communication control device according to claim 1, further comprising:
a control information receiver configured to receive first downlink transmission control information from the radio communication device, the first downlink transmission control information indicating an instruction to transmit, to the first radio IP network, IP packets as many as the number transmittable within a latter half time frame;
wherein the processor is configured to acquire a virtual address of the radio communication device, the virtual address being associated with the first care of IP address and the second care of IP address; and
a first downlink transmitter configured to add the first care of IP address to an IP packet including the virtual address received from the communication destination, and to transmit the IP packet to the first radio IP network based on the first downlink transmission control information received by the control information receiver.

3. The communication control device according to claim 2, wherein
the control information receiver further receives second downlink transmission control information indicating an instruction to transmit, to the second radio IP network, a remaining number of IP packets excluding the number of IP packets transmittable within the latter half time frame, and
the communication control device further comprising a second downlink transmitter configured to add the second care of IP address to an IP packet including the virtual address received from the communication destination, and to transmit the IP packet to the second radio IP network based on the second downlink transmission control information received by the control information receiver.

4. The communication control device according to claim 1, wherein the processor changes a size of the former half time frame based on the number of already received IP packets.

5. The communication control device according to claim 4, wherein the processor increases the size of the former half time frame in a case where a number of IP packets obtained by subtracting a number of IP packets to be received within the former half time frame by a number of IP packets to be received within a sub-time frame not greater in size than the former half time frame is smaller than a number of already received IP packets.

6. The communication control device according to claim 4, wherein the processor decreases the size of the former half time frame in a case where a number of IP packets obtained by subtracting a number of IP packets to be received within the former half time frame by a number of IP packets to be received within the sub-time frame not greater in size than the former half time frame is greater than a number of already received IP packets.

7. The communication control device according to any one of claims 5 and 6, wherein the sub-time frame is a time frame defined in accordance with a jitter buffer that absorbs jitter of the IP packets.

8. A radio communication device that executes communications with a communication destination via a communication control device by use of a first radio IP network in which a first care of IP address is dynamically assigned to the radio communication device in accordance with a position, and of a second radio IP network in which a second care of IP address is assigned to the radio communication device, the radio communication device comprising:
a receiver configured to receive an IP packet transmitted from the communication destination via the first radio IP network in a predetermined cycle;
a processor configured
to determine whether or not a bandwidth of the first radio IP network used for receiving the IP packet from the communication control device is of a size capable of transferring the IP packet within a predetermined time period based on a number of already received IP packets that have been received by the receiver from the communication control device within a former half time frame;
to add the first care of IP address to each of IP packets as many as a number transmittable by use of the bandwidth within a latter half time frame subsequent to the former half time frame, and to transmit first downlink transmission control information to the communication control device in a case where the bandwidth determination unit determines that the bandwidth is not of a size capable of transmitting the IP packet within the predetermined time period, the first downlink transmission control information indicating an instruction to transmit, to the first radio IP network, IP packets to each of which the first care of IP address is added; and
to add the second care of IP address to each of a remaining number of IP packets excluding the number of IP packets to each of which the first care of IP address is added, and to transmit second downlink transmission control information to the communication control device, the second downlink transmission control information indicating an instruction to transmit, to the second radio IP network, the IP packets to each of which the second care of IP address is added.

9. The radio communication device according to claim 8, further comprising:
a control information receiver configured to receive first uplink transmission control information from the communication control device, the first uplink transmission control information indicating an instruction to transmit, to the first radio IP network, IP packets as many as the number transmittable within the latter half time frame;
a virtual address storage unit configured to store a virtual address of the radio communication device, the virtual address being associated with the first care of IP address and the second care of IP address; and
a first uplink transmitter configured to transmit an IP packet including the virtual address and the first care of IP address to the first radio IP network, based on the first uplink transmission control information received by the control information receiver.

10. The radio communication device according to claim 9, wherein
the control information receiver further receives second uplink transmission control information indicating an instruction to transmit, to the second radio IP network, the remaining number of IP packets excluding the number of IP packets transmittable within the latter half time frame, and the radio communication device further comprising a second uplink transmitter configured to transmit an IP packet including the virtual address and the second care of IP address to the second radio IP network based on the second uplink transmission control information received by the control information receiver.

11. The radio communication device according to claim 8, wherein the processor changes a size of the former half time frame based on a number of already received IP packets.

12. The radio communication device according to claim 11, wherein the processor increases the size of the former half time frame in a case where a number of IP packets obtained by subtracting a number of IP packets to be received within the former half time frame by a number of IP packets to be received within a sub-time frame not greater in size than of the former half time frame is smaller than a number of already received IP packets.

13. The radio communication device according to claim 11, wherein the processor decreases the size of the former half time frame in a case where a number of IP packets obtained by subtracting a number of IP packets to be received within the former half time frame by a number of IP packets to be received within a sub-time frame not greater in size than of the former half time frame is greater than a number of already received IP packets.

14. The radio communication device according to any one of claims 12 and 13, wherein the sub-time frame is a time frame defined in accordance with a jitter buffer that absorbs jitter of the IP packets.

15. A communication control method of controlling a communication path to a radio communication device by use of a first radio IP network in which a first care of IP address is dynamically assigned to the radio communication device in accordance with a position of the radio communication device, and of a second radio IP network in which a second care of IP address is assigned to the radio communication device, the method comprising the steps of:
receiving an IP packet transmitted from the radio communication device to a communication destination via the first radio IP network in a predetermined cycle and relaying the IP packet to the communication destination;
determining whether or not a bandwidth of the first radio IP network used for receiving the IP packet from the radio communication device is of a size capable of transferring the IP packet within a predetermined time period, based on a number of already received IP packets received from the radio communication device within a former half time frame;
transmitting first uplink transmission control information to the radio communication device in a case where it is determined that the bandwidth is not of a size capable of transferring the IP packet within the predetermined time period, the first uplink transmission control information indicating an instruction to transmit, to the first radio IP network, IP packets as many as a number transmittable by use of the bandwidth within a latter half time frame subsequent to the former half time frame; and
transmitting second uplink transmission control information to the radio communication device, the second uplink transmission control information indicating an instruction to transmit, to the second radio IP network, a remaining number of IP packets excluding the number of IP packets transmittable within the latter half time frame.

16. A radio communication method of executing communications with a communication destination via a communication control device by use of a first radio IP network in which a first care of IP address is dynamically assigned to the radio communication device in accordance with a position of the radio communication device, and of a second radio IP network in which a second care of IP address is assigned to the radio communication device, the method comprising steps of:
receiving an IP packet transmitted from the communication destination via the first radio IP network in a predetermined cycle;
determining whether or not a bandwidth of the first radio IP network used for receiving the IP packet from the communication control device is of a size capable of transferring the IP packet within a predetermined time period based on a number of already received IP packets received from the communication control device within a former half time frame;
adding the first care of IP address to each of IP packets as many as a number transmittable by use of the bandwidth within a latter half time frame subsequent to the former half time frame, and transmitting first downlink transmission control information to the communication control device, in a case where it is determined that the bandwidth is not of a size capable of transmitting the IP packet within the predetermined time period, the first downlink transmission control information indicating an instruction to transmit, to the first radio IP network, the IP packets to each of which the first care of IP address is added; and
adding the second care of IP address to each of a remaining number of IP packets excluding the IP packets to each of which the first care of IP address is added, and transmitting second downlink transmission control information to the communication control device, the second downlink transmission control information indicating an instruction to transmit, to the second radio IP network, the IP packets to each of which the second care of IP address is added.

* * * * *